US012562063B2

(12) United States Patent
Pfitzer et al.

(10) Patent No.: US 12,562,063 B2
(45) Date of Patent: Feb. 24, 2026

(54) METHOD FOR DETECTING ROAD USERS

(71) Applicant: Continental Autonomous Mobility Germany GmbH, Ingolstadt (DE)

(72) Inventors: Martin Pfitzer, Lindau (DE); Stefan Heinrich, Achern (DE); Manuel du Bois, Bad Freienwalde (DE); Felix Hachfeld, Lindau (DE); Elias Strigel, Wangen (DE)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 528 days.

(21) Appl. No.: 17/757,727

(22) PCT Filed: Dec. 8, 2020

(86) PCT No.: PCT/DE2020/200111
§ 371 (c)(1),
(2) Date: Jun. 20, 2022

(87) PCT Pub. No.: WO2021/121490
PCT Pub. Date: Jun. 24, 2021

(65) Prior Publication Data
US 2023/0343105 A1 Oct. 26, 2023

(30) Foreign Application Priority Data

Dec. 18, 2019 (DE) ..................... 10 2019 220 009.5

(51) Int. Cl.
*G08G 1/16* (2006.01)
*G06V 10/75* (2022.01)
(Continued)

(52) U.S. Cl.
CPC ............. *G08G 1/166* (2013.01); *G06V 20/58* (2022.01); *G06V 40/103* (2022.01); *G06V 40/23* (2022.01); *G06V 10/751* (2022.01)

(58) Field of Classification Search
CPC ...... G08G 1/166; G06V 20/58; G06V 40/103; G06V 40/23; G06V 10/751; G01S 7/4802;
(Continued)

(56) References Cited

U.S. PATENT DOCUMENTS

2012/0147188 A1* 6/2012 Yokochi ................. G06V 40/23
348/148
2012/0262284 A1* 10/2012 Irrgang ................. B60W 50/14
340/435
(Continued)

FOREIGN PATENT DOCUMENTS

CN 103745196 A 4/2014
CN 105006175 A 10/2015
(Continued)

OTHER PUBLICATIONS

Wang et al., "Leverage of Limb Detection in Pose Estimation for Vulnerable Road Users," 2019 IEEE Intelligent Transportation Systems Conference (ITSC), Auckland, New Zealand, 2019, pp. 528-534, doi: 10.1109/ITSC.2019.8917065. (Year: 2019).*
(Continued)

*Primary Examiner* — Emily C Terrell
*Assistant Examiner* — Julia Z. Yao
(74) *Attorney, Agent, or Firm* — Buchanan Ingersoll & Rooney PC

(57) ABSTRACT
The present disclosure relates to a method and system for recognizing road users, in particular persons in road traffic The method includes the following steps:
recording at least one ambient image or a sequence of ambient images an optical sensor of a vehicle,
(Continued)

S1 | Record ambient image(s)

S2 | Detect person in image(s)

S3 | Determine person pose

S4 | Determine presence of transport means

S5 | Assign movement profile detecting a person in the ambient image, determining a pose of the detected person;

determining a presence of a means of transport of the person; and assigning a movement profile to the person based on the determined means of transport of the person.

10 Claims, 1 Drawing Sheet

(51) Int. Cl.
| | |
|---|---|
| *G06V 20/58* | (2022.01) |
| *G06V 40/10* | (2022.01) |
| *G06V 40/20* | (2022.01) |

(58) Field of Classification Search
CPC ......... G01S 17/931; G06T 2207/10016; G06T 2207/30196; G06T 2207/30241; G06T 2207/30261; G06T 7/73
See application file for complete search history.

(56) References Cited

U.S. PATENT DOCUMENTS

| | | | |
|---|---|---|---|
| 2015/0066348 A1* | 3/2015 | Baba .................. | B60W 30/095 701/301 |
| 2015/0186723 A1 | 7/2015 | Liu et al. | |
| 2015/0310265 A1 | 10/2015 | Suerth et al. | |
| 2015/0371095 A1* | 12/2015 | Hartmann ................. | G06T 7/11 348/148 |
| 2016/0012301 A1 | 1/2016 | Arndt et al. | |
| 2017/0132334 A1* | 5/2017 | Levinson .............. | B60W 50/00 |
| 2018/0156624 A1* | 6/2018 | Bai ....................... | G08G 1/0112 |
| 2018/0253595 A1* | 9/2018 | Aoki ........................ | G08G 1/16 |
| 2020/0082212 A1* | 3/2020 | Alcock ................... | G06N 3/084 |
| 2020/0231160 A1* | 7/2020 | Zass ................ | B60W 30/18163 |
| 2020/0239026 A1* | 7/2020 | Anthony .............. | B60W 40/09 |
| 2020/0394393 A1 | 12/2020 | Kraft et al. | |
| 2021/0201052 A1* | 7/2021 | Ranga ...................... | G06N 3/08 |
| 2022/0013008 A1* | 1/2022 | Katz ........................ | H04W 4/38 |

FOREIGN PATENT DOCUMENTS

| | | | | |
|---|---|---|---|---|
| CN | 108062868 A | * | 5/2018 | .............. B60Q 9/00 |
| DE | 102013207223 A1 | | 10/2014 | |
| DE | 102014214090 A1 | * | 3/2015 | ............. G08G 1/166 |
| DE | 102014207802 B3 | | 10/2015 | |
| DE | 102017204404 B3 | * | 6/2018 | |
| DE | 102019220508 A1 | * | 6/2021 | ............. G08G 1/165 |
| WO | 2019048011 A1 | | 3/2019 | |
| WO | 2019116099 A1 | | 6/2019 | |

OTHER PUBLICATIONS

Pérez et al., "Single-Frame Vulnerable Road Users Classification with a 77 GHz FMCW Radar Sensor and a Convolutional Neural Network," 2018 19th International Radar Symposium (IRS), Bonn, Germany, 2018, pp. 1-10, doi: 10.23919/IRS.2018.8448126. (Year: 2018).*

Ahmed et al., "Pedestrian and Cyclist Detection and Intent Estimation for Autonomous Vehicles: A Survey," Applied Sciences, 9, No. 11: 2335. https://doi.org/10.3390/app9112335 (Year: 2019).*

Maurya et al., "Deep Learning based Vulnerable Road User Detection and Collision Avoidance," 2018 IEEE International Conference on Vehicular Electronics and Safety (ICVES), Madrid, Spain, 2018, pp. 1-6, doi: 10.1109/ICVES.2018.8519504. (Year: 2018).*

Ishii et al., "CHLAC based vision sensing method for bicycle rider detection to avoid confusing similar shape pedestrian," 2013 Seventh International Conference on Sensing Technology (ICST), Wellington, New Zealand, 2013, pp. 390-395, doi: 10.1109/ICSensT.2013.6727682. (Year: 2013).*

The International Search Report and the Written Opinion of the International Searching Authority mailed on Apr. 7, 2021 for the counterpart PCT Application No. PCT/DE2020/200111.

German Patent Office National Search Report issued on Oct. 14, 2020 for the counterpart German Patent Application No. 102019220009. 5.

Georgia Gkiozari, et al., "R-CNNs for Pose Estimation and Action Detection", https://doi.org/10.48550/arXiv.1406.5212 [cs.CV], 2014.

Yu-Wei Chao, et al., "Learning to Detect Human-Object Interactions", 2018 IEEE Winter Conference on Applications of Computer Vision, pp. 381-389, Mar. 12-15, 2018, Lake Tahoe, NV, USA.

Yaniei Gu, et al., "Recognition and Pose Estimation of Urban Road Users from On-board Camera for Collision Avoidance", 17th International IEEE Conference on Intelligent Transportation Systems (ITSC), pp. 1266-01273, Oct. 8-11, 2014, Qingdao, China.

Office Action (The First Office Action) issued Oct. 25, 2025, by the State Intellectual Property Office of People's Republic of China in corresponding Chinese Patent Application No. 202080082507.X and an English translation of the Office Action. (18 pages).

* cited by examiner

S1  Record ambient image(s)

S2  Detect person in image(s)

S3  Determine person pose

S4  Determine presence of transport means

S5  Assign movement profile

METHOD FOR DETECTING ROAD USERS

CROSS-REFERENCE TO RELATED APPLICATIONS

This U.S. patent application claims the benefit of PCT patent application No. PCT/DE2020/200111, filed Dec. 8, 2020, which claims the benefit of German patent application No. 10 2019 220 009.5, filed Dec. 18, 2019, both of which are hereby incorporated by reference.

TECHNICAL FIELD

The invention relates to a method for recognizing road users, in particular persons in road traffic.

BACKGROUND

The process of recognizing road users by means of ADAS sensors such as, for example, a camera, radar or lidar and to coarsely classify them as a person, vehicle or animal is known from the prior art. Furthermore, the process of tracking these road users, for example, for a movement prediction is known.

Thus, for example, DE102014207802B3 discloses a method and a system for proactively recognizing an action of a road user. To this end, an image, which is structured pixel by pixel, of the road user is captured and corresponding image data are generated by means of a camera.

However, the disadvantage in this case is that current processes of capturing and classifying persons are not always sufficient, since the most varied modes of behavior and transport are possible for persons in road traffic.

BRIEF SUMMARY

It is accordingly an object of the present disclosure to provide a method which makes it possible to capture and classify persons more precisely and more robustly.

This object is addressed by the subject-matter of the independent claims. Further advantageous configurations are the subject-matter of the subclaims.

In general, the interaction and communication possibilities of the road users are extremely complex. It is in principle possible to extend a classification approach in such a way that not only coarse classification results such as a person or vehicle, but more specific classification results which, for example, describe more detailed characteristics of the person, may be recognized.

However, this approach is difficult to implement in practice since it is associated, inter alia, with a great deal of effort in terms of the amount of data and the related outlay for data acquisition, labeling, etc., since the classification is applied, as a general rule, to the raw data, e.g., camera image.

In particular, it is important to know whether a person is to be categorized as a pedestrian or whether the person is moving, for example, with a means of transport, for reliable trajectory planning.

According to the present disclosure, a method for recognizing road users, in particular persons in road traffic, including the following steps is therefore proposed:

recording at least one ambient image or a sequence of ambient images by means of an optical sensor of a vehicle, detecting a person in the ambient image, determining a pose of the detected person;

determining a presence of a means of transport of the person; and assigning a movement profile to the person based on the determined means of transport of the person.

Here, the optical sensor is preferably a mono camera or a stereo camera system. The use of a surround view camera system or a combination of the aforementioned alternatives would also be conceivable. An ambient image or a sequence of ambient images is recorded with at least one of these cameras. An algorithm which recognizes objects and persons in images is then applied to this ambient image or the sequence of images. So-called convolutional neural networks (CNN) or neural networks, for example, are suitable for this. These CNNs may be trained, inter alia, to recognize persons in order to be able to infer a person by reference to certain features in the ambient image.

In order to determine the pose of the person, a skeleton-like representation may be generated for the person. This skeleton-like representation is generated by means of detecting key points, by connecting the recognized key points to one another. Accordingly, the skeleton-like representation represents a relative position and orientation of individual body parts of the pedestrian. The pose of a person may be determined from this information. To this end, a comparison may be carried out, for example, between the detected pose and a look-up table, in order, e.g., to be able to categorize the orientation or posture of the person more quickly.

In order to determine the presence of a means of transport, objects which may be assigned to the person based on their vicinity are considered. Here as well, the neural network may be trained accordingly in order to identify certain objects as means of transport and to distinguish these, e.g., from items of luggage being carried.

If a means of transport is recognized beyond doubt, a possible predefined movement profile may be assigned on this basis. Here, general parameters may likewise already be stored for certain means of transport such as, for example, a bicycle, skateboard or inline skates, which are included in the selection of the movement profile.

In an example embodiment, the presence of a means of transport is determined by considering a time sequence of pose states or by considering individual images. The consideration of a time sequence of pose states is advantageous in that, when a certain means of transport is used, a pose is either permanently assumed or at least certain movement patterns and, consequently, different poses are repeated. Thus, a cyclist has, for example, a certain pose. In the case of a skateboarder, a certain pattern of movement is repeated when a foot is used to push and, consequently, certain poses are repeated several times within a certain period of time.

However, a presence of a means of transport may also be achieved based on individual images. This is in particular possible in the case of a sensor data fusion such as, for example, between a radar sensor and a camera sensor. Thanks to the radar sensor, speeds of certain limbs may, for example, be determined based on the available Doppler velocities. In combination with the image of a camera, it is possible to recognize a means of transport in this way since there exists, for example, a certain movement pattern of the legs for the use of a means of transport.

In a further configuration, the means of transport is classified by a corresponding classifier. To this end, a classifier may be trained accordingly in order to distinguish, for example, between an inline skater, a skateboarder, a normal pedestrian or a cyclist, etc., on the basis of the pose, in particular on the basis of the typical leg movements.

It is further possible that a criticality of the person is determined based on the determined means of transport. This criticality describes, for example, the probability that the person will cross the road. Depending on the means of transport, changes of direction are possible more quickly. In connection with a higher speed than that of a normal pedestrian, a person with a corresponding means of transport represents a higher risk and has to be assessed or categorized accordingly in order to be able to adjust driving functions or intervention threshold values accordingly, if necessary. In this case, e.g., the driving speed of the vehicle may be reduced, or an intervention threshold value of an EBA (emergency brake assistant) system may be lowered if a higher criticality of the recognized person is determined. Furthermore, the region with the recognized person may be scanned more frequently, or the ROI (region of interest) may be enlarged in order to ensure that the person is recognized for a certain period of time, or it may be directly focused on the person.

In a particular example embodiment, the predicted movement profile includes a maximum speed, degrees of freedom of the person and/or a direction of movement. These different parameters may be stored for each individual, potentially recognizable means of transport, for example in a look-up table. In the light of the example embodiments, degrees of freedom are understood to be the different possibilities for changing direction based on the direction, the angle in relation to the current direction of movement and the speed of the change of direction. Depending on the means of transport, more or quicker changes of direction are possible. An inline skater can, for example, carry out a change in direction with a larger angle more quickly than, for example, a cyclist. Model-based tracking may also be optimized by the movement profile, in particular with respect to the maximum achievable speeds in connection with the means of transport. Furthermore, the vehicle may adapt more quickly to a change in the direction of movement of the person, since a more accurate prediction of the position of the person in the next time step becomes possible.

Furthermore, according to the present disclosure, a system for recognizing road users, in particular persons in road traffic, is proposed, including at least one optical sensor for recording an ambient image or a sequence of ambient images as well as a data processing device which is configured to analyze the recorded ambient image and to carry out person recognition, to carry out pose recognition of the person, to determine the presence of a means of transport in the image, and to assign a movement profile to the person based on the means of transport.

The data processing device uses, for example, a CNN (convolutional neural network). This makes it possible for the data processing device to carry out person and pose recognition with the aid of trained classifiers. Furthermore, classifiers may be trained, by means of which a certain means of transport may be inferred based on certain features. A movement profile may then be assigned to each of these means of transport.

BRIEF DESCRIPTION OF THE DRAWINGS

Further advantageous configurations and embodiments are set out in the drawings, wherein.

DETAILED DESCRIPTION

Figure 1:
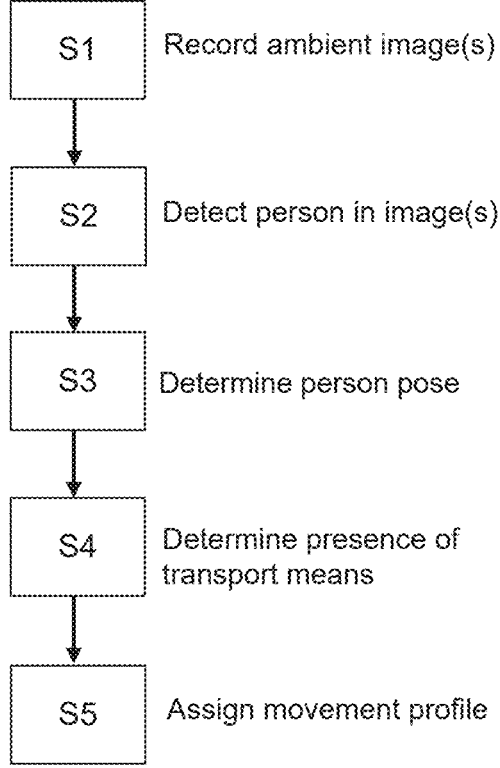
FIG. 1 shows a schematic flow chart of an embodiment of the present disclosure.

FIG. 1 shows a schematic flow chart of an embodiment of the invention. In step S1, an ambient image or a sequence of images is recorded by means of at least one optical sensor 2. In step S2, a person is detected in this ambient image. In a further step S3, a pose of the detected person is determined. Furthermore, in step S4, the presence of a means of transport is determined. In a next step S5, a movement profile is assigned to the person based on the determined means of transport of the person.

Figure 2:
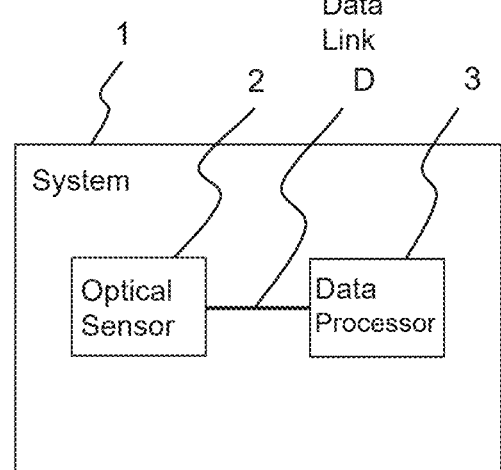
FIG. 2 shows a schematic representation of an embodiment of the present disclosure.

FIG. 2 shows a schematic representation of an embodiment of the invention. In this case, a system 1 for recognizing road users, in particular persons in road traffic, is shown in a schematic representation. The system 1 includes an optical sensor 2 as well as a data processing device 3. The optical sensor 2 as well as the data processing device 3 are connected via a data link D, by means of which image data may be transmitted from the optical sensor 2 to the data processing device. It would be conceivable for the data processing device to be connected to one or more actuators which, based on the results of the data processing device, control the vehicle accordingly. The data link D may be configured in a wired manner. However, wireless connections such as, for example, WLAN, Bluetooth or the like would also be conceivable.

LIST OF REFERENCE NUMERALS

1 System
2 Optical sensor
3 Data processing device
D Data link
S1-S5 Method steps

The invention claimed is:

1. A method for recognizing road users, in particular persons in road traffic, comprising:

recording at least one ambient image or a sequence of ambient images by an optical sensor of a vehicle;

detecting a person in the at least one recorded ambient image or the sequence of recorded ambient images;

determining a pose of the detected person;

determining a presence of a means of transport of the person, wherein the presence of the means of transport is determined by considering a time sequence of pose states of the detected person or by considering individual images of the at least one recorded ambient image or the sequence of recorded ambient images, wherein the means of transport is classified by a classifier, the classifier classifies the means of transport on the basis of the pose of the detected person and leg movements corresponding to the classification;

assigning a movement profile to the person based on the determined presence of the means of transport of the person and the classification of the means of transport;

determining a criticality in a probability of the person crossing a road based on the determined presence of the means of transport; and reducing an intervention threshold value of an emergency brake assistant system when a predetermined criticality threshold of the person crossing the road is met.

2. The method according to claim 1, wherein the assigned movement profile comprises at least one of a maximum speed, degrees of freedom of the person or a direction of movement.

3. The method according to claim 1, further comprising at least partly controlling, by an actuator of the vehicle, the vehicle based in part upon the movement profile.

4. The method according to claim 1, further comprising storing a distinct movement profile for each potential classification of a plurality of classifications of different means of transport.

5. The method according to claim 1, wherein the presence of the means of transport is determined based upon the pose states of the detected person being repeatable within a period of time.

6. A system for recognizing road users, in particular persons in road traffic, comprising:

at least one optical sensor for recording an ambient image or a sequence of ambient images as well as a data processor which is configured to:

analyze the recorded ambient image or the sequence of recorded ambient images and to carry out person recognition;

carry out pose recognition of the person;

determine a presence of a means of transport of the person in the recorded ambient image or the sequence of recorded ambient images, wherein the presence of the means of transport is determined by considering a time sequence of pose states of the detected person or by considering individual images of the at least one recorded ambient image or the sequence of recorded ambient images, wherein the means of transport is classified by a classifier, the classifier classifies the means of transport on the basis of the pose of the detected person and leg movements corresponding to the classification;

assign a movement profile to the person based on the determined presence of the means of transport and the classification of the means of transport;

determine a criticality in a probability of the person crossing a road based on the determined presence of the means of transport; and reduce an intervention threshold value of an emergency brake assistant system when a predetermined criticality threshold of the person crossing the road is met.

7. The system according to claim 6, wherein the assigned movement profile comprises a maximum speed, degrees of freedom of the person and/or a direction of movement.

8. The system according to claim 6, further comprising at least one vehicle actuator coupled to the data processor, the actuator at least partly controlling a vehicle based upon the movement profile.

9. The system according to claim 6, further comprising non-transitory memory coupled to the data processor and having stored therein a distinct movement profile for each potential classification of a plurality of classifications of different means of transport.

10. The system according to claim 6, wherein the presence of the means of transport is determined based upon the pose states of the detected person being repeatable within a period of time.

\* \* \* \* \*